July 16, 1968     B. J. CARR     3,393,316
SELF-RECTIFIED POSITIVE ION ACCELERATOR AND NEUTRON GENERATOR
Filed April 23, 1964     3 Sheets-Sheet 1
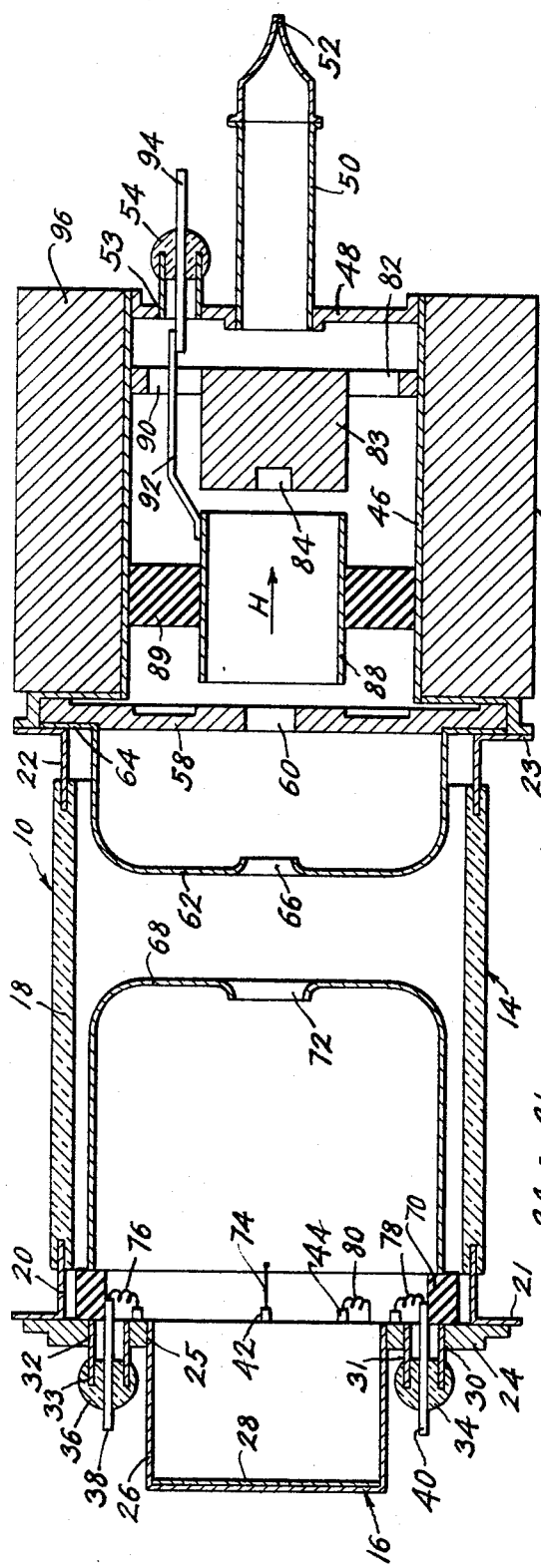
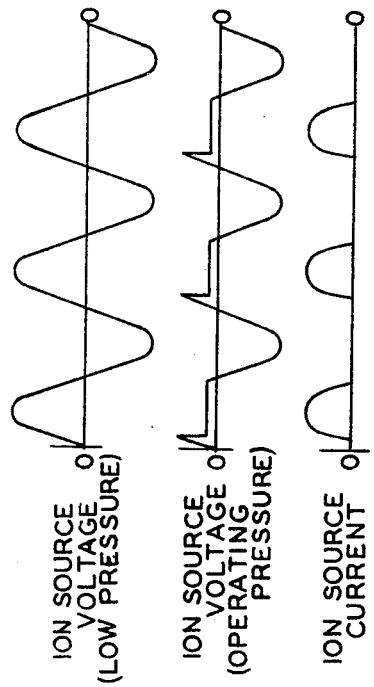
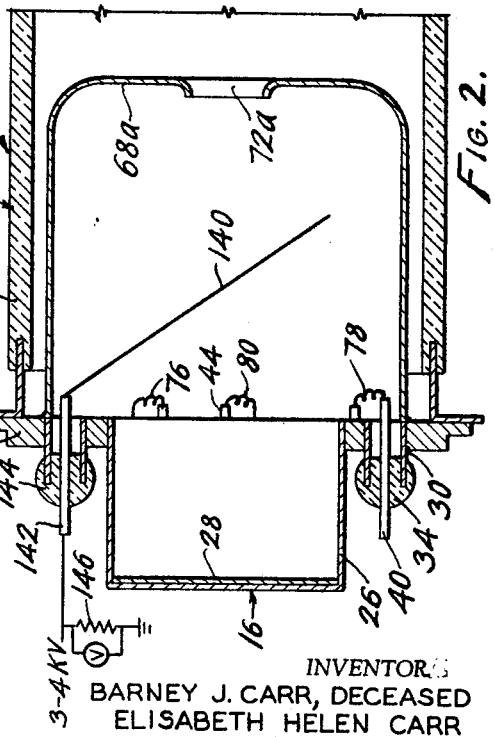
INVENTOR
BARNEY J. CARR, DECEASED
ELISABETH HELEN CARR
ADMINISTRATOR
BY Anderson, Spangler & Wymore
ATTORNEYS July 16, 1968
B. J. CARR
3,393,316
SELF-RECTIFIED POSITIVE ION ACCELERATOR AND NEUTRON GENERATOR
Filed April 23, 1964
3 Sheets-Sheet 1
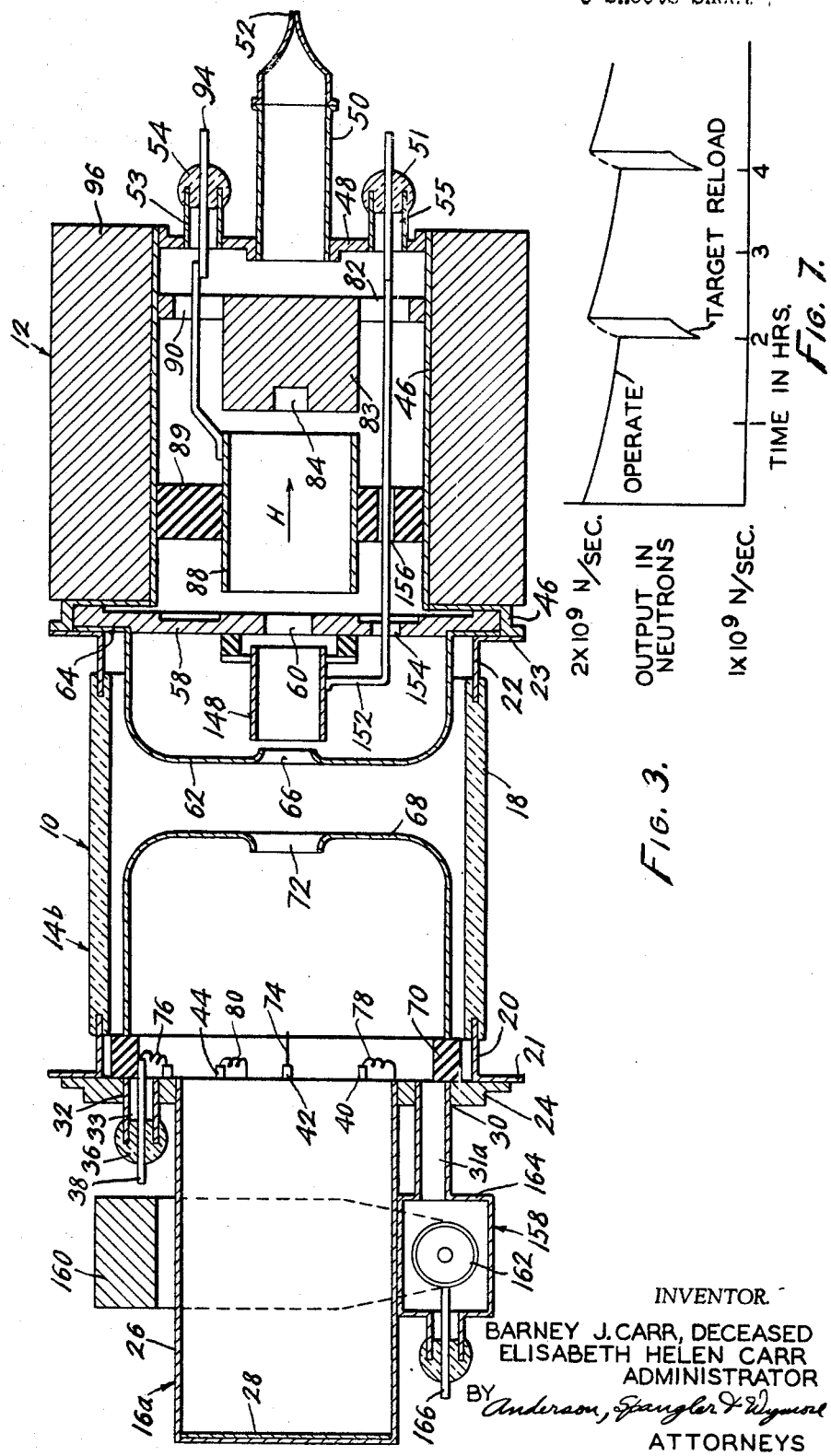
INVENTOR.
BARNEY J. CARR, DECEASED
ELISABETH HELEN CARR
ADMINISTRATOR
BY Anderson, Spangler & Wymore
ATTORNEYS July 16, 1968
B. J. CARR
3,393,316
SELF-RECTIFIED POSITIVE ION ACCELERATOR AND NEUTRON GENERATOR
Filed April 23, 1964
3 Sheets-Sheet 3
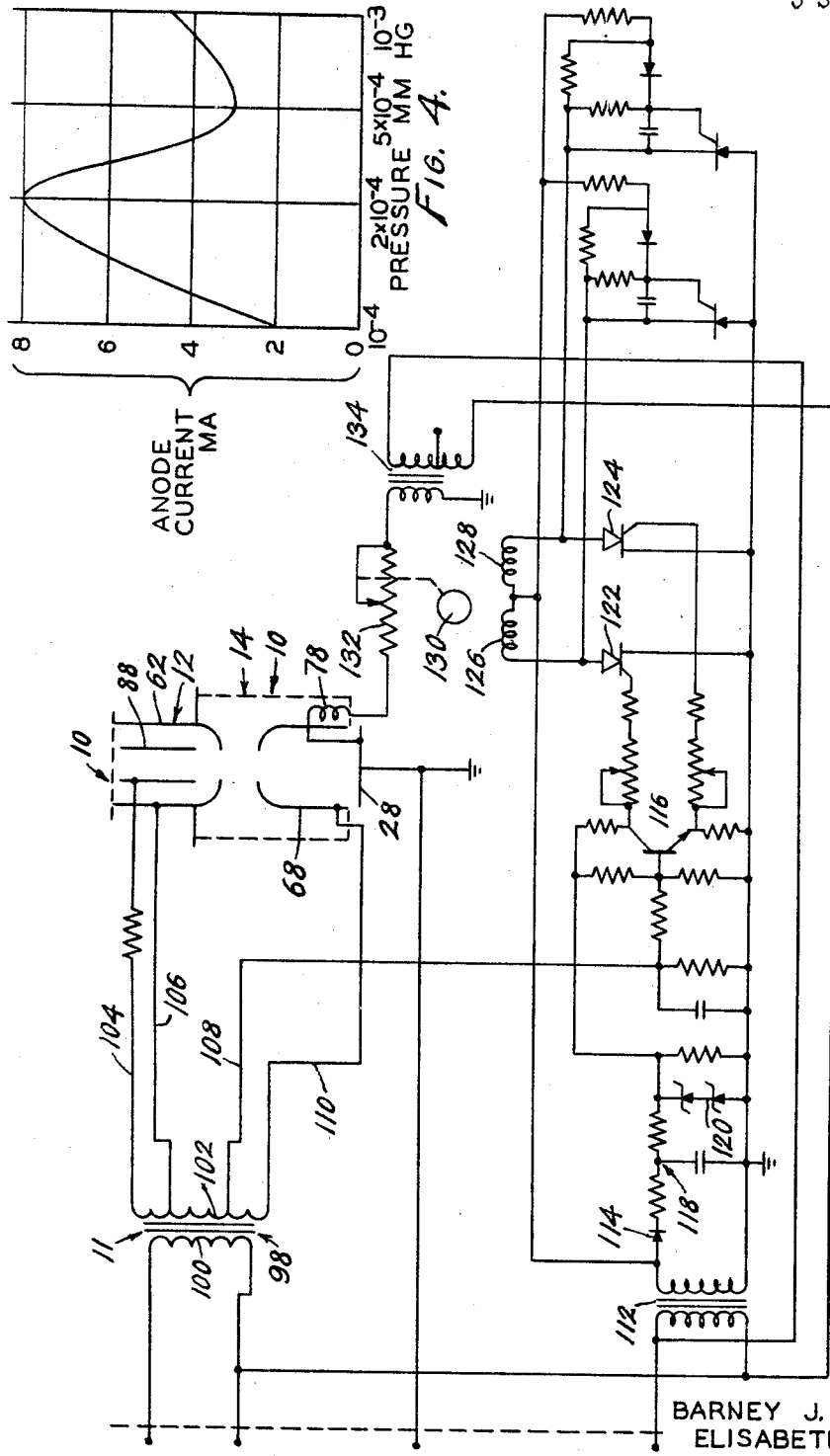
INVENTOR.
BARNEY J. CARR, DECEASED
ELISABETH HELEN CARR
ADMINISTRATOR
BY
Anderson, Spangler & Wymore
ATTORNEYS

United States Patent Office 3,393,316
Patented July 16, 1968

3,393,316
SELF-RECTIFIED POSITIVE ION ACCELERATOR AND NEUTRON GENERATOR
Barney J. Carr, deceased, late of Colorado Springs, Colo., by Elisabeth H. Carr, special administratrix, Colorado Springs, Colo., assignor to Kaman Corporation, a corporation of Connecticut
Filed Apr. 23, 1964, Ser. No. 363,064
15 Claims. (Cl. 250—84.5)

This invention relates to neutron generators and, in particular, to a sealed neutron generator tube providing a high neutron flux and being of small dimensions.

Neutron generators of various types are well known in the art and in carrying out of various experimental test and analysis procedures in the field of nuclear physics, a neutron source which is readily portable and provides a high neutron output is highly desirable. Since many of the test procedures and uses require rapid repetition of an intense short pulse of neutrons, such a source of neutrons is highly desirable. Much of the neutron generators available heretofore were too large for easy mobility or were not capable of producing the desired neutron intensity.

The present invention contemplates and has for its principal object the provision of a highly efficient, simplified and relatively inexpensive neutron generator wherein the $T(d, n)He^4$ reaction or $D(d, n)He^3$ reaction is used to generate essentially monoenergic neutrons.

The present invention is concerned with providing an improved neutron generator as a source of high neutron output and which avoids one or more of the disadvantages of prior art arrangements.

A further object of the present invention is to provide an improved neutron generator tube in which the target thereof is at or near ground potential.

A further object of the present invention is the provision of an improved neutron generator tube which is self-rectifying and wherein the accelerating potential is alternating current avoiding the need for expensive current rectifying devices.

A still further object of the present invention is to provide improvements in both the components, component arrangement and circuitry of a pulsed neutron generator adapted either for well logging and/or laboratory use.

Another important object of the present invention is the provision of a neutron generator including automatic pressure control for the generator tube to permit maximum efficiency of operation.

Still another important object of the present invention is the provision of a novel means of suppression of secondary electrons from the target of the generator tube.

A still further object of the present invention is to provide a novel method of loading the target in situ initially and when the reaction material becomes depleted.

Other objects are to improve and simplify the construction of a highly compact neutron generator in a manner to permit fabrication at relatively low manufacturing cost, the improved unit being of rugged construction and operable over a long service life with a minimum of maintenance.

For a better understanding of the present invention, together with further and other objects thereof, reference is had to the following description taken in connection with the accompanying drawings and its scope will be pointed out in the appended claims.

In the drawings:

FIGURE 1 is a view in section of one embodiment of the neutron generator tube according to the present invention;

FIGURE 2 is a view in section, with parts broken away to conserve space, of another embodiment of a neutron generator according to the invention;

FIGURE 3 is a cross-sectional view of still another embodiment of the neutron generator tube of the invention;

FIGURE 4 is a graphical representation of the anode current versus pressure within the neutron generator tube;

FIGURE 5 illustrates a circuit diagram, partly schematic, of a complete neutron generator according to the present invention including a novel pressure control system;

FIGURE 6 is a representation of the wave forms of the voltage and current supplied to the ion source at low and operating gas pressure; and, FIGURE 7 is a representation of the neutron output of a neutron generator during operation and target loading.

The production of fast neutrons is generally well known in the art, for example, the production of neutrons by a $T(d, n)He^4$ or $D(d, n)He^3$ reaction, but the devices for production of such have heretofore been either quite bulky and not adapted to portable use or have not permitted rapid repetitive pulsing which is highly desirable in certain applications of laboratory and production uses. Both portability and the capability of producing rapid high intensity pulses of neutrons are necessary for certain tests and research work as, for example, some oil well logging, some neutron reactor tests and some laboratory nuclear research.

Several neutron generators embodying the present invention are herein illustrated and described and each operates effectively over long periods of use to generate neutrons having an average neutron yield of greater than about $10^9$ neutrons per second. The principles taught herein are, of course, not limited to a generator of neutrons at one particular energy level and with suitable modifications the illustrated generators will operate in an equally dependable manner to produce neutrons at other energy levels. For example, while each apparatus herein described involves a D-T reaction, it is apparent that with certain modifications of the ion source, target, and voltages employed, either a T-D or a D-D reaction could be obtained, the characteristics of which are well known in the art.

With reference to FIGURE 1 of the drawing there is shown on embodiment of a neutron generator according to the invention which includes a positive ion accelerator which is generally referred to by reference numeral 10 and a power supply 11, FIGURE 5, from whence the accelerator 10 obtains the necessary voltages for operation.

The power supply 11 and accelerator tube 10 are preferably mounted within a protective housing, not shown, which may be filled with oil or gas under pressure or evacuated to protect the generator components from voltage breakdown. Control and operation functions are performed externally of the housing through suitable connections thereto.

As seen from FIGURE 1, the positive ion accelerator tube 10 comprises as basic component parts an ion source 12, an accelerator section 14 and target 16. Positive ions are produced in ion source 12, and are accelerated in section 14 to target 16. The neutron generator includes an assembly housed in a glass and metal cylinder comprising a cylindrical glass insulator 18, the ends of which have bonded thereto, by glass to metal seals, sleeves 20 and 22 having outturned flanges 21 and 23. A metal disc 24 provides an end closure for the target end of the tube and is welded to flange 21 to provide a unitary structure. The disc 24 is provided with a centrally positioned aperture 25 receiving a cup 26 having a target 28 attached to the closed end thereof. Radially of the central aperture 25, disc 24 is provided with several smaller apertures 30 and 32, and the like, with tubular extensions 31 and 33 receiving insulators 34 and 36. Insulators 34 and 36 receive lead-ins 38 and 40 in gas-tight relation and similar insulators receive leads 42 and 44 in similar manner. At the other end of cylinder 18 a metal sleeve extension 46 is attached to flange 23 of sleeve 22 as by welding. The sleeve extension 46 is closed at its outer end by disc 48 centrally apertured to receive tube 50. Tube 10 is evacuated through tube 50 and sealed off as by pinch seal 52 when the processing of the tube is completed. Disc 48 is radially apertured at 53 to receive an extension and insulator 54 through which conductor 94 passes.

A magnet 96 is mounted to surround the sleeve extension 46 and be substantially coextensive therewith. A disc cathode 58, having a central aperture 60, is positioned at the juncture of sleeves 22 and 46 transverse of cylinder 18 and secured thereto in suitable manner as by welding. A cylindrical cup-shaped control electrode 62 is provided with an outwardly extending flange 64 at the open end which is attached to the margin of cathode 58 again as by welding. The closed end of electrode 62 extends part way into the interior of cylinder 18 and is provided with a central aperture 66 having the edges thereof flared to present a smooth rounded surface toward the target 28. At the other end of cylinder 18, another cup-shaped electrode 68 is positioned with the open end thereof toward the target. The electrode 68 is mounted upon and insulated from disc 24 by insulator means 70. The closed end of electrode 68 is provided with a central aperture 72 having the edges thereof flared toward the target to present a smooth surface in opposing relation to the smooth surface of electrode 62. Electrode 68 is electrically connected to external lead-in 42 by means of conductor 74. Electrode 68 serves to suppress secondary electrons generated at the target and shapes the accelerating field so that a defocused spot of ions impinges on the target 28. Lead-ins 38, 40 and 44 are respectively connected to reservoirs 76, 78 and 80 for the purpose to be explained as the description progresses.

The ion source 12 of neutron generator tube 10 in addition to cathode 58 is provided with cathode 82 both of which are preferably magnetic. Cathode 82 is of a disc configuration mounted within sleeve 46 and located adjacent disc 48. Centrally of cathode 82 is a cylindrical portion 83 concentrically positioned with respect to the disc and sleeve 46 and provided with a recess 84 in the end thereof facing cathode 58. Intermediate cathodes 58 and 82 and supported by insulator 86 is a non-magnetic anode 88 of cylindrical configuration concentrically positioned within sleeve 46 and in axial alignment with cathodes 58 and 82. The disc portion of cathode 82 is provided with an aperture 90 through which an electrical conductor 94 passes and is electrically connected to anode 88. Conductor 94 passes in gas-tight seal relationship through insulator 54. Anode 88 is supported by insulator 89 attached to sleeve 96.

The reservoirs 76, 78 and 80 are preferably of zirconium or titanium and the like, with reservoir 76 being loaded with tritium, 78 loaded with deuterium and 80 being unloaded. The target 28 may be tritium loaded titanium or zirconium supported on a copper backing being or forming a part of cup 26. Tritium or deuterium may be selectively introduced into the interior of tube 10 by heating reservoirs 76 or 78 as by the passage of electrical current therethrough.

The magnetic field for ion source 12 is provided by a magnet 96 surrounding sleeve 46. The ion source ionizes tritium and deuterium gas by means of a crossed electric and magnetic field supplied by magnet 96, cathodes 58 and 82 and anode 88. Magnet 96 produces a magnetic field H parallel to the axis of anode 88. A field value for example of 400 to 600 gauss has been used with success. A positive voltage of about one to several thousand volts is applied to anode 88 from lead-in 94, via conductor 92, and anode 88 is operated positive with respect to the cathodes. The discharge produced in the ion source is the familiar PIG (Phillips ionization gauge) discharge; however, the dimensions, voltages and the magnetic field strength chosen for use in the ion source permit a large discharge current at pressures within the tube of from $10^{-4}$ to $10^{-3}$ mm. of Hg as illustrated in the graph of FIGURE 4.

The extracted ions leave the ion source 12 and pass through aperture 60 of cathode 58 to be rapidly accelerated to target 28, which may be of tritium loaded titanium, for the production of neutrons at a high output. The target 28 and electrode 68 are driven negative in the range of up to about 200 kv. with respect to electrode 62 which is operated negative with respect to anode 88 of the ion source. The ions move from cathode 58 through opening 60 into the space between cathode 58 and electrode 62 and exit through aperture 66 in electrode 62. The ions are accelerated by electrode 68 through aperture 72 to drift to target 28 where the ions interact with the target materials to produce neutrons. Electrode 68 serves to suppress secondary electrons generated at target 28 and shapes the accelerating field so that a defocused spot of ions impinges thereon.

The opposing surfaces of electrodes 62 and 68 are provided with extremely smooth surfaces to avoid high voltage arcing therebetween.. The electrode 68 furnishes an electric field distribution to cause the ions to be defocused and reach target 28 in a spread-out fashion but in a manner to avoid hitting electrodes 62, 68 or cup 26. When the ions, which are accelerated between electrodes 62 and 68 through apertures 66 and 72, strike target 28, they cause electrons to be released which if permitted to travel to the ion source 12 would produce a total current flow in the tube many times the ion current.

In order to reduce the total current flow in the tube, the tube in FIGURE 1, has electrode 68 electrically isolated from the rest of the structure by insulator 70. Electrode 68 is maintained more negative than the target to repel electrons from the accelerating gap between electrodes 68 and 62.

It will be noted that target 28 at ground potential is planar and lies in a position to be completely accessible exteriorly of the tube. Further, the configuration permits the obtaining of high flux in contrast to a cylindrical target.

Referring again to FIGURE 5, the power supply 11 for tube 10 is seen to comprise a step-up AC tarnsformer 98, having a primary winding 100 for connection to a suitable source of 60 cycle electrical alternating current or other low frequency current. The power for the ion source 12 is supplied by the winding 104–106 of the secondary 102 of transformer 98. The voltage applied is at least 4 kv. peak to peak and the current drain is on the order of about 5–20 ma. The ion source 12 generates ions only during the positive half cycle of the source voltage when source current flows as shown graphically in curves a, b and c of FIGURE 6. Voltage for target 28 is furnished by winding 106–110 of transformer 98. Electrode 68 is held negative with respect to target 28, which is at ground potential, during the time that beam current flows in the tube.

Tube 10 encloses a very clean evacuated chamber maintained at a high degree of vacuum into which deuterium or titanium gas is furnished at a pressure of from between about $2 \times 10^{-9}$ mm. Hg to about $1 \times 10^{-3}$ mm. Hg. The tube is provided with reservoirs 76, 78 and 80 as shown in the form of a heater coil of titanium or zirconium which is loaded with tritium or deuterium in a manner known to the art. The tube is outgased and sealed off as at seal 52. For purposes of illustration, reservoir 78 is loaded with deuterium, reservoir 76 is loaded with tritium and reservoir 80 is left clean to act as a getter.

Target 28 may be preloaded with tritium or may be loaded and replenished in situ, as will be described as the description progresses. The tritium of the target is depleted during the production on neutrons and must be replaced. The tritium is derived from reservoir 76 when the reservoir is heated by the passage of an electrical current therethrough. In like manner deuterium is introduced by reservoir 78 to be ionized and accelerated to target 28. Deuterium entering the reaction and that pumped into the walls of the ion source is replaced from reservoir 78. Non-reaction gases are gettered by reservoir 80.

The target current can conveniently be used to control the pressure within tube 10. Referring again to FIGURE 5, a circuit to accomplish such control is illustrated. AC power is stepped-up in transformer 112 and rectified by diode 114 as a DC power supply for transistor amplifier 116. A filter network 118 filters the rectified current and Zener diodes 120 provide voltage regulation. An input signal for amplifier 116 is derived from lead 108 of transformer 98 which is proportional to the target current. Since target current is a function of tube pressure, the signal is also proportional to and changes as the gas pressure changes within the tube. The output of amplifier 116 from the collector and emitter is a positive going and negative going DC signal. The trigger level on diodes 122 and 124 cause the forward or reverse windings 126 or 128 of motor 130 to be selectively activated at a predetermined signal level from amplifier 116. Motor 130 is connected to drive the wiper arm of rheostat 132. Rheostat 132 is connected at one end to ground potential through the secondary winding of transformer 134 and at the other end through reservoir 78. Thus, the amount of deuterium gas released by reservoir 78 is controlled by the temperature produced by current flow therein which is a function of the positioning of the wiper arm of rheostat 132. The wiper arm is positioned by motor 130 moving in a direction determined by the output of amplifier 116 which is in turn determined by the input thereto from lead 108. The particular gas pressure to be maintained is determined by the trigger level of diodes 122 and 124. The above control system adjusts the tube pressure for the next operation of the accelerator and adjusts the pressure only during the operation of the tube.

The target 28 may be loaded initially and reloaded after the tube is sealed by a novel process to be described. The target 28 comprises a copper disc having a thin layer of titanium evaporated thereon. The target assembly 16 including reservoirs 76, 78 and 80 are assembled along with the complete tube assembly including ion source 12 and accelerator 14. The tube is checked for leaks and placed on a vacuum system. The system is pumped down to on the order of less than about $1 \times 10^{-7}$ mm. Hg. Heat is applied externally of the tube to outgas same, raising the temperature to the neighborhood of about 415° C. while maintaining the pressure less than about $1 \times 10^{-5}$ mm. Hg. The pumping and heating is continued until the pressure is less than about $1 \times 10^{-7}$ mm. Hg. A loading reservoir, not shown, of tritium external of pinch tube 50 is heated to evolve tritium gas and deliver same into the interior of tube 10 through tube 50. A relatively low voltage is applied to the tube on the order of about 20 to 30 kv. between the target and cathode and the heating of the loading reservoir is continued until a discharge is obtained in the tube. The tube is operated under these conditions for about an hour at 2 to 3 ma. beam current. The power is then removed from the tube and the tritium gas pressure is raised to about 100 mm. Hg. Reservoir 76 is heated by passing an electric current therethrough and then is allowed to cool to take up all of the tritium gas present in the tube to thus load reservoir 76.

Deuterium gas is introduced into the tube from an external source, not shown, through pinch tube 50 to a pressure of from about 10 to about 100 mm. Hg. Reservoir 78 is heated by an electric current and then cooled to take up all of the deuterium present. The pinch tube 50 is then sealed off as at 52.

The tube is placed into operation with the target being at a potential on the order of about 100–170 kv. Reservoir 78 is heated to introduce deuterium gas and maintain a suitable gas pressure which may be for example on the order of about $2 \times 10^9$ mm. Hg. The tube is operated under these conditions for a period until the neutron output drops about 20% due to depletion of tritium in target 28. An operating period of about 2 hours will normally produce this result. To reload the target the operating voltage is then reduced to about 25–75 kv. at an increased current of 2 to 3 ma. Deuterium introduction is terminated and tritium introduction is started. The tube is operated at these conditions for a sufficient length of time to reload the target which will normally take about 12 to 15 minutes. The target 28 is thus reloaded with tritium during which neutron output is quite low. FIGURE 7 represents a plot of neutron output tube 10 versus time during normal operation and target reloading. After the target has been reloaded for a period of time sufficient to replenish the depleted tritium in target 28, the voltage on the target is again raised to the operating voltage, 100–170 kv., the tritium reservoir 76 is shut down and deuterium gas is introduced from reservoir 78 to resume high neutron output. This process of operation and target reloading may be repeated as often as needed to maintain the required neutron output.

In the embodiment of the invention illustrated in FIGURE 1, the electron current is essentially obviated and the tube is protected from excessive electron current by having electrode 68 at a more negative potential than the target 28 thus repelling electrons from the accelerating gap between electrodes 62 and 68. Also as previously mentioned, with respect to FIGURE 5, electrode 68 being insulated from the target permits the use of beam current as a measurement of gas pressure within the tube. The arrangement of FIGURE 1 requires that the tube be operated, however, before the gas pressure in the tube can be regulated.

Referring now to FIGURE 2, there is shown a neutron generator tube 10a, with parts broken away being identical to the right hand side of tube 10 of FIGURE 1. FIGURE 2 has parts broken away to conserve space. In contrast to the arrangement of FIGURE 1, electrode 68a is electrically connected to disc 24 and is maintained at ground potential along with target 28. This construction is a much more rugged type of construction than that of FIGURE 1. An additional element in the form of an electron suppression electrode 140 of rod shape is provided within the hollow wall portion of electrode 68a and connected to lead 142 insulated from disc 24 by insulator 144. The suppression electrode 140 comprises a small diameter wire which serves as an anode of a small discharge device. The discharge device uses the target and interior of electrode 68a as the cathode. Electrode 140 may be quite small compared to the cross-sectional area of the wall portion of 68a, on the order of about .001 to about .005 inch in diameter to obtain a measure of gas pressure from about $10^{-4}$ to $20 \times 10^{-3}$ mm. Hg. A potential of from 3 to 4 kv. is applied to anode 140 from lead 110 of transformer 98, FIGURE 5. The discharge of the device is limited by a large resistor 146 in series therewith making it essentially a constant current device. During the positive half-cycle of the power supply the pressure in the tube is measured by measuring the voltage drop across the resistor 146. During the negative half-cycle when beam current flows in tube 10, the anode 140 compels electrons, emitted from the target 28 as a result of ion impingement, to be repelled and prevented from entering the acceleration gap existing between electrodes 68a and 62.

Referring now to the embodiment of FIGURE 3, the neutron generator includes a positve ion accelerator 10 and a power supply 11, FIGURE 5, which supplies the operating voltages from a low frequency alternating current source, such as 60 cycle and the like. The positive ion accelreator comprises an ion source 12, an accelerator section 14b and a target section 16a. The neutron generator includes an assembly housed in a glass and metal cylinder including a cylindrical glass insulator 18, the ends of which have bonded thereto, by glass to metal seals, sleeves 20 and 22 having outturned flanges 21 and 23. A metal disc 24 provides an end closure for the target end of the tube and the disc is welded to flange 21 to provide a unitary structure. Disc 24 is provided with a centrally located opening 25 receiving a cup 26. A target 28 is mounted on the inside of the closed end of cup 26. The annular portion of disc 24 around opening 25 is provided with a plurality of smaller openings 30, 32 and the like receiving tubular extensions 31a, 33 or the like. A conductor 38 passes into the interior accelerator 10 through extension 33 and sealed thereto in gas-tight relation by insualtor 36. Conductors 40 and 44 are similarly provided for. At the end of cylinder 18 opposite disc 24, a tubular metal sleeve extension 46 is secured to flange 23 of sleeve 46 by welding and the like. Sleeve 46 is closed at its outer extremity by disc 48. Disc 48 is centrally apertured to receive tube 50 and apertured at 53 and 55 to receive an extension and insulators 54 and 51 through which conductors 94 and 95 pass into the interior of the tube. Tube 50 provides the means through which the tube 10 is evacuated. After the processing of the tube is completed it is sealed off by means of a pinch seal as at 52.

Magnet 96 is mounted to surround the sleeve extension 46 and is substantially coextensive therewith. A cathode 58 is positioned at the juncture of sleeves 22 and 46 to be transverse of cylinder 18. Cathode 58 is fastened to sleeve 46 as by welding and has a central opening 60 therethrough. A cylindrical cup-shaped control electrode 62 has an outwardly extending flange 64 at the open end. Flange 64 is secured to cathode 58 and flange 23 as by welding. The closed end of electrode 62 extends into the interior of cylinder 18 and has an opening 66 centrally located in the closed end. The edges of opening 66 are flared to present a smooth rounded surface toward target 28. A focus and gating electrode 148 is positioned intermediate cathode 58 and eletcrode 62. Electrode 148 of tubular configuration and is supported on insulation members 142 attached to cathode 58 to be in axial alignment with opening 60 in cathode 58 and opening 66 in electrode 62. A lead-in conductor 152 is connected to electrode 148 and passes through an opening 154 in cathode 58, opening 156 in insulator 89 and an opening in cathode 82 to pass exteriorly of tube 10, in gas-tight relation through insulator 51. At the other end of cylinder 18, another cup-shaped electrode 68 is positioned with the open end thereof toward the target. The electrode is mounted upon disc 24 by means of insulator 70. The closed end of electrode 68 is provided with a central opening 72 having the edges thereof flared toward target 28 and presenting a smooth surface in opposing relation to the smooth surface of electrode 62. The purpose of the opposing smooth surfaces is to prevent arcing therebetween even when at great potential differences. Electrode 68 is electrically connected to an external lead-in 42 by means of a conductor 74. Electrode is normally maintained at a negative potential with respect to target 28 and serves to suppress secondary electron emission from the target. Lead-ins 38, 40 and 44 are connected respectively to reservoirs 76, 78 and 80 which may be energized to control gas pressure.

Within the extension 46 of the ion source 12 and adjacent end closure disc 48, a cathode 82 is positioned. Cathode 82 is of a disc configuration and like cathode 58 is magnetic material. Cathode 82 is formed with a centrally located cylindrical portion 83 axially extending toward cathode 58. The end of the cylinder 83 toward cathode 58 is provided with a recess 84. A tubular nonmagnetic anode 88 is positioned between cathodes 82 and 58 and supported by insulator 89 which is attached to sleeve 46 in a suitable manner. Lead-in conductor 94 passes through insulator 54 and opening 90 in cathode 82 to connect to anode 88.

The reservoirs 76 and 78 may be tritium and deuterium loaded titanium or zirconium. Reservoir 80 is left unloaded to act as a getter. Target 28 may comprise a copper backing with a layer of titanium or zirconium, loaded with tritium. Tritium or deuterium gas is introduced into the interior of the tube 10 by passage of current through reservoirs 76 and 78.

A magnetic field is provided by a magnet 96 surrounding sleeve 46 of the ion source 12. Tritium and deuterium gas is ionized in an ion source 12 by means of a crossed electric and magnetic field supplied by cathodes 58 and 82, anode 88 and magnet 96. Anode 88 is operated positive with respect to cathodes 58 and 82. The extracted ions leave the ion source 12 and pass through aperture 60 of cathode 58 on their way to target 28. The ions leaving the source are controlled by a potential on electrode 148 so that in the region of this electrode, the direction and speed of the ion travel can be modified to either stop the ions or to cause them to follow optimum paths for focus characteristics on target 28. A positive voltage some higher than that applied to anode 88 will shut off the flow and a voltage applied to electrode 140 which is negative with respect to that applied to cathode 58 increases the efficiency of the extraction of ions from the ion source. The embodiment of FIGURE 3 includes a PIG pressure gauge 158 whose magnetic field is supplied by magnet 160 which also suppresses secondary electrons from target 28. Gauge 158 operates on the same principle as ion source 12 and the anode 162 is maintained positive with respect to the cathodes 164 which are also the containing walls of the gauge. Voltage is applied to anode 162 through lead 166 and the anode current of the gauge is a function of tube pressure and may be used for control purposes to gauge and regulate gas pressure in the tube in a manner similar to that described with respect to FIGURE 5.

It will be appreciated that the several purposes have been accomplished in providing a neutron generating device wherein the target is at ground potential and is readily accessible for close proximity of target to that being irradiated. Further, the neutron generator operates from an alternating current source directly and obviates the necessity of costly and cumbersome voltage rectifying devices.

Further, the embodiment of FIGURE 2 provides an electron suppression electrode which also serves as an anode of a small discharge device using the target and adjacent electrode as the cathode to provide an improved gauge for the control of gas pressure within the interior of the tube.

While there have been described what at present are considered to be the preferred embodiments of this invention, it will be obvious to those skilled in the art that various changes and modifications may be made therein without departing from the invention. It is aimed therefore in the appended claims to cover all such changes and modifications which fall within the true spirit and scope of the invention.

What is claimed is:

1. Apparatus for generating neutrons comprising in combination, an elongated generally cylindrical envelope defining a sealed chamber confining a gaseous hydrogen isotope under low pressure, said chamber containing an ion source, a target axially spaced from said source adapted to include a substance which reacts with impinging ions to produce neutrons, means for selectively releasing an isotope of hydrogen within the chamber, accelerator means for accelerating and directing ions from said source to said target, means for applying an alternating current potential to said ion source for the production of ions and between said ion source and said target to accelerate ions into neutron producing collision with said target and means maintaining said target at ground potential during neutron generation.

2. The apparatus as set forth in claim 1 wherein the isotope of hydrogen within the chamber comprises at least one of the gases deuterium and tritium.

3. Apparatus in accordance with claim 1 wherein the chamber further contains means to suppress secondary electron emission from the target.

4. The apparatus as set forth in claim 1 wherein the target is planar and is positioned at one axial extremity of the cylindrical envelope forming one end thereof to provide a substantially uniform source of neutrons immediately available externally of said envelope.

5. Apparatus as in claim 3 wherein the means to suppress secondary electrons from the target includes a cylindrical electrode having an apertured wall at one end thereof.

6. Apparatus as in claim 5 wherein the cylindrical electrode is operated at a negative potential with respect to the target during electron suppression.

7. Apparatus for generating neutrons comprising in combination, an elongated generally cylindrical envelope defining a sealed chamber confining a gaseous hydrogen isotope under low pressure, said chamber containing an ion source, a target axially spaced from said source adapted to include a substance which reacts with impinging ions to produce neutrons, means for selectively releasing an isotope of hydrogen within the chamber, accelerator means for accelerating and directing ions from said source to said target and means for applying an alternating current potential between said ion source and said target to accelerate ions into neutron producing collision with said target, wherein the chamber further contains means to suppress secondary electron emission from the target, wherein the means to suppress secondary electrons from the target includes a cylindrical electrode having an apertured wall at one end thereof, wherein the electrode is maintained at the same potential as the target and further includes an inner electrode of rod shape positioned within the cylindrical electrode, the cross sectional size of the inner electrode being very much smaller than the cross sectional area within the wall portion.

8. Apparatus for generating neutrons comprising in combination an elongaetd generally cylindrical envelope defining a sealed chamber confining a gaseous hydrogen isotope under low pressure, said chamber containing an ion source, a target axially spaced from said source adapted to include a substance which reacts with impinging ions to produce neutrons, means for selectively releasing an isotope of hydrogen within the chamber, accelerator means for accelerating and directing ions from said source to said target, means for confining ion travel between said source and target to optimum paths, means to suppress secondary electron emission from said target, means for applying an alternating current potential to said ion source and between said ion source and said target to accelerate ions into neutron producing collisions with said target and means maintaining the target at ground potential during neutron generation.

9. Apparatus as set forth in claim 8 wherein the isotope of hydrogen within the chamber comprises at least one of the gases deuterium and tritium.

10. Apparatus as in claim 8 wherein the means to suppress the secondary electrons from the target includes a cylindrical electrode having a hollow wall portion.

11. Apparatus as in claim 10 wherein the cylindrical electrode is operated at a potential negative with respect to the target during electron suppression.

12. Apparatus for generating neutrons comprising in combination an elongated generally cylindrical envelope defining a sealed chamber confining a gaseous hydrogen isotope under low pressure, said chamber containing an ion source, a target axially spaced from said source adapted to include a substance which reacts with impinging ions to produce neutrons, means for selectively releasing an isotope of hydrogen within the chamber, accelerator means for accelerating and directing ions from said source to said target, means for confining ion travel between said source and target to optimum paths, means to suppress secondary electron emission from said target and means for applying an alternating current potential between said ion source and said target to accelerate ions into neutron producing collisions with said target, wherein the means to suppress the secondary electrons from the target includes a cylindrical electrode having a hollow wall portion, wherein the electrode is maintained at target potential and further includes an inner electrode of rod shape positioned within the cylindrical electrode, the cross sectional size of the inner electrode being very much smaller than the cross sectional area within the wall portion.

13. Apparatus as in claim 11 including means for continuously evacuating and maintaining said chamber under a high degree of vacuum.

14. In a method of loading a target in a neutron generator tube including a sealed chamber filled with deuterium gas and containing an ion source and a target spaced therefrom wherein the tube is normally operated with a high potential between the ion source and the target, said chamber containing a source of deuterium and tritium gases adapted to selectively introduce and remove deuterium and tritium gases from within the sealed chamber, the steps which comprise: removing the high potential from between the ion source and the target; withdrawing the atmosphere of deuterium gas from within the sealed chamber; introducing an atmosphere of tritium gas at relatively low pressure into said chamber; applying a relatively low potential between the ion source and the target to produce a discharge within the tube for a time sufficient to load said target with tritium ions; removing the low potential from the tube; withdrawing the tritium gas from said chamber; and, introducing an atmosphere of deuterium gas into the chamber.

15. The method of claim 14 wherein the tube is operated at a potential between the ion source and the target of from about 20 to about 30 kilovolts during the target loading compared with a potential of from about 100 to about 170 kilovolts for neutron generation.

References Cited

UNITED STATES PATENTS

| | | | |
|---|---|---|---|
| 2,988,642 | 6/1961 | Soloway | 250—84.5 |
| 3,240,970 | 3/1966 | Reifenschweiler | 250—84.5 X |
| 3,246,191 | 4/1966 | Frentrop | 250—84.5 X |

ARCHIE R. BORCHELT, *Primary Examiner.*